United States Patent [19]

Kraus

[11] Patent Number: 4,658,674
[45] Date of Patent: Apr. 21, 1987

[54] TRACTION ROLLER TRANSMISSION WITH FIXED TRANSMISSION RATIO

[75] Inventor: Charles E. Kraus, Austin, Tex.

[73] Assignee: Excelermatic Inc., Austin, Tex.

[21] Appl. No.: 378,059

[22] Filed: May 14, 1982

[51] Int. Cl.[4] .............................................. F16H 13/06
[52] U.S. Cl. ........................................ 74/798; 74/208
[58] Field of Search ............... 74/798, 208, 206, 202, 74/796; 267/162, 161

[56] References Cited

U.S. PATENT DOCUMENTS

| | | | |
|---|---|---|---|
| 771,541 | 10/1904 | Ericson | 74/206 |
| 1,212,462 | 1/1917 | Donnelly | 74/206 |
| 1,704,205 | 3/1929 | Oakes et al. | 74/208 |
| 1,956,934 | 5/1934 | Stelzer | 74/206 |
| 2,565,108 | 8/1951 | Zahodiakin | 267/162 |
| 2,634,123 | 4/1953 | Ralston | 267/162 |
| 2,918,514 | 12/1959 | Everett | 267/162 |
| 3,060,767 | 10/1962 | Parrett | 74/798 |
| 3,107,766 | 10/1963 | Pritchard | 267/161 |
| 3,610,060 | 10/1971 | Hewko | 74/208 |
| 4,215,595 | 8/1980 | Kraus | 74/798 |

OTHER PUBLICATIONS

*Mechanical Design and Systems Handbook*, pp. 14-8, 14-9, FIGS. 14.6 and 14.7.

Primary Examiner—Allan D. Herrmann

[57] ABSTRACT

A traction roller transmission having a number of traction rollers disposed in an annular space formed between a sun roller structure rotatable with one shaft and a traction ring structure surrounding the sun roller. The traction rollers are rotatably supported and the traction rollers or the traction ring structures are mounted for movement with another shaft. At least one of the traction surfaces of the sun roller and the traction ring structures is formed by a sleeve and radially slotted spring washers are disposed behind the sleeve. Cam structures are arranged axially adjacent the spring washers such that a torque transmitted through the transmission forces the spring rings onto said sleeve and said sleeve toward said traction rollers for firm engagement of the traction rollers with the traction ring and the sun roller structures.

6 Claims, 3 Drawing Figures

TRACTION ROLLER TRANSMISSION WITH FIXED TRANSMISSION RATIO

BACKGROUND OF THE INVENTION

1. Field of the Invention

The invention relates to fixed ratio traction roller transmissions in which the contact forces applied to the traction surfaces which are in engagement with each other for the transmission of movement are dependent on the torque transmitted through the transmission.

2. Description of the Prior Art

Traction roller transmissions in which large contact forces are applied to prevent slippage of the rollers are described for example by Harold A. Rothbart in "Mechanical Design And Systems" Handbook, pages 14-8 and 14-9, McGraw-Hill, New York, 1964. In the relatively simple arrangements of FIGS. 14.6 and 14.7 wherein the outer rings are slightly undersized to compress the roller arrangements, the surface pressure on the traction surfaces is always the same; that is, it is always high independently of the torque transmitted through the transmission. Various transmission arrangements are also known in which the contact pressure of the traction surfaces is dependent on the size of the torque transmitted through the transmission, for example, as in those shown on page 14-8 of said handbook. A transmission of this type in which the forces with which the traction rollers are held in engagement with one another is shown in U.S. Pat. No. 3,610,060. A transmission which includes Belleville-type springs on the sun roller or the traction ring surrounding the planetary rollers is disclosed in the present inventor's earlier U.S. Pat. No. 4,215,595.

In such a traction roller transmission, a sun roller is supported by one of coaxial input and output shafts and traction rollers are disposed around the sun roller, while a traction ring structure surrounds, and is in contact with, the traction rollers. One or both of the traction ring and sun roller structures include a plurality of Belleville-type spring rings arranged between means for compressing the spring rings so as to cause engagement of the traction rollers with the sun roller and the traction ring structures. In an arrangement according to the present inventor's earlier application Ser. No. 281,983, the radial spring ring surfaces in engagement with the traction rollers are rounded to reduce wear of the roller surfaces.

Transmission of large torques however requires large contact forces which, with a relatively small contact area, results in relatively high wear. In addition, the Belleville springs' radial surfaces must be manufactured within very small tolerances.

SUMMARY OF THE INVENTION

In a traction roller transmission with concentric sun roller and traction ring structures and traction rollers arranged in the annular space between, and in engagement with, the sun roller and traction ring structures, the traction surface of at least one of the traction ring and sun roller structures is formed by a thin-walled sleeve which is supported by a stack of radially inclined spring washers disposed between compression means for flattening the spring washers when a torque is transmitted through the transmission. Such flattening causes radial expansion of the spring washers against the traction sleeve which is forced toward the traction rollers for firm engagement of the traction rollers with the traction ring and sun roller structures upon transmission of a torque. The spring washers have radial slots extending from the traction sleeve interface to minimize stresses in the spring washers.

DESCRIPTION OF THE PREFERRED EMBODIMENTS

Figure 1:
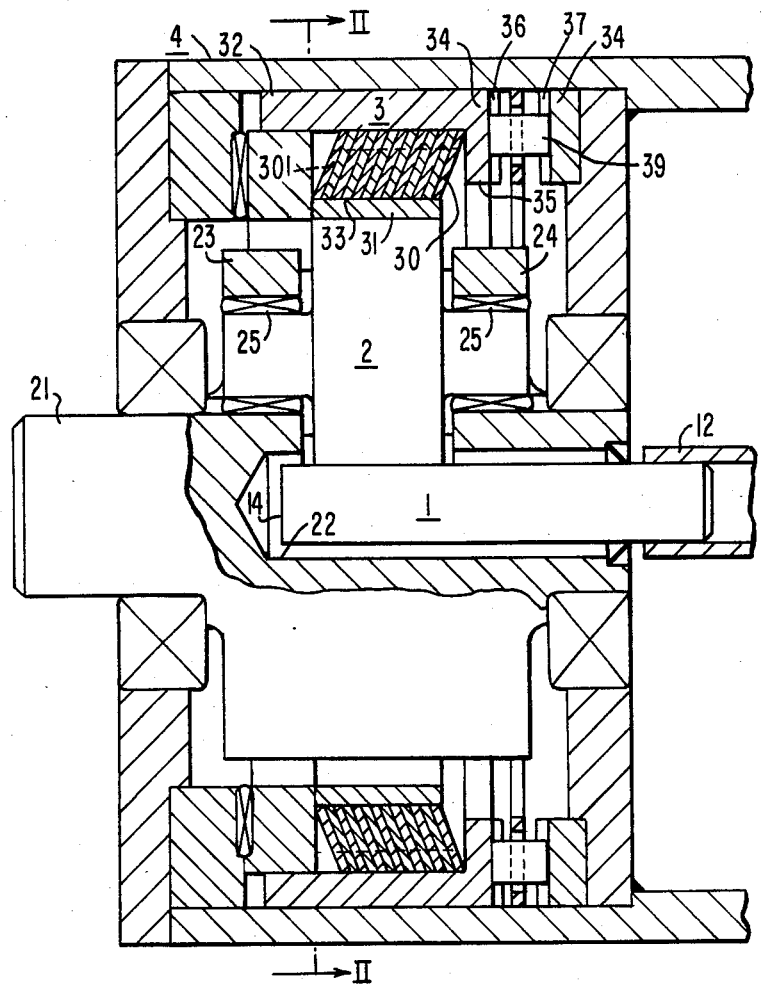
FIG. 1 is a cross-sectional view of a traction roller transmission.

FIG. 1 shows a traction roller transmission including basically a sun roller 1 centrally disposed within a traction ring assembly 3 and traction rollers 2 arranged in the annular path between the sun roller 1 and the traction ring assembly 3.

The sun roller 1 is part of, or mounted on, an input shaft 12 for rotation therewith. The input shaft 12 may have a trunnion 14 extending into a bore 22 in an output shaft 21 where it may be supported by a bearing. The output shaft 21 has a flange 23 which, together with an opposite ring structure 24, carries the traction rollers 2 on roller bearings 25. The traction rollers 2 are cylindrical and are in contact with the central sun roller 1.

The traction ring assembly 3 is disposed within a housing 4 and consists of a support ring structure 32 which houses spring washers 30. Adjacent their inner surfaces 33 there is arranged a thin-walled traction sleeve 31 which is in engagement with the traction rollers 2. Cam structures 34 are mounted opposite each other in the housing 4 adjacent a shoulder 35 of support ring 32, which engages the spring washers 30. The opposite surfaces of the cam structures 34 are provided with cam surfaces 36 and 37 and rollers or balls 39 are held in the space between the cam surfaces so that relative rotational movement between the cams 36 and 37 forces the support ring 32 with its shoulder 35 against the spring washers 30, thereby compressing the spring washers 30, which forces their inner surfaces 33 inwardly against the traction sleeve 31 thereby causing firm engagement of the traction sleeve 31 with the traction rollers 2.

Figure 2:
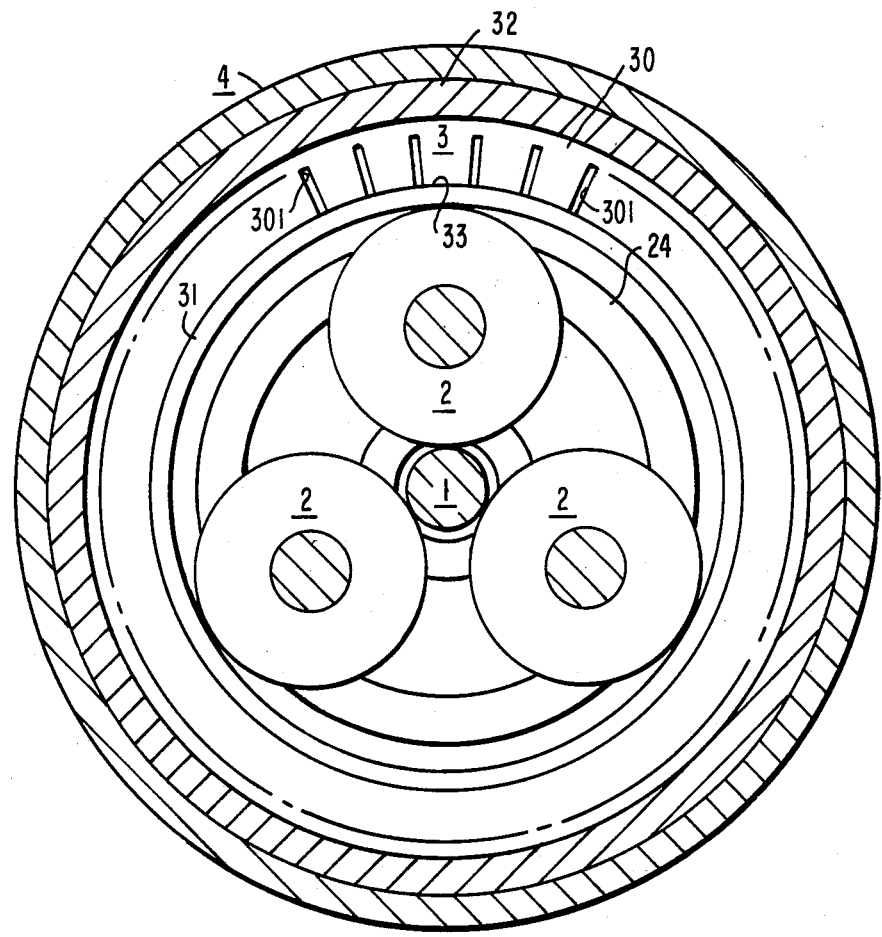
FIG. 2 is a cross-sectional view along line II—II of FIG. 1.

As shown in FIG. 2, the spring washers 30 are finished with cylindrical inner and outer surfaces and provided with radial slots 301 at their radially inner ends for relatively large bending flexibility.

The greater flexibility of the slotted spring washers requires smaller cam compression forces and permits a greater cone-shape of the spring washers for greater radial motion of the spring washers upon compression. In addition, washer stresses become negligible. Nevertheless the surface of the traction sleeve 31 which is in engagement with the traction rollers 2 remains smooth as the traction sleeve takes up only radial forces for its compression into engagement with the traction rollers 2.

Figure 3:
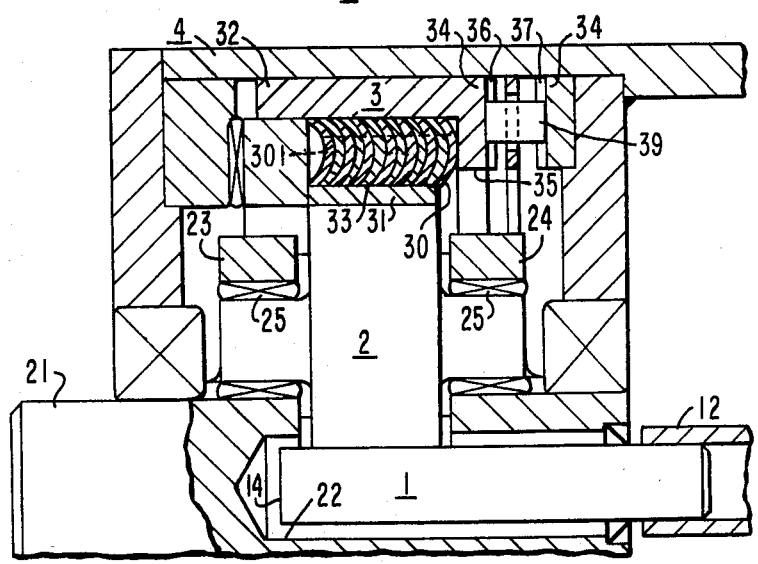
FIG. 3 is a section of the transmission showing another embodiment of the invention.

FIG. 3 shows a section of a transmission wherein there are provided spring washers 50 with a contoured shape. They are also slotted to increase their flexibility. Here, the compression forces are applied at the radial center of the washers between both rims for flattening the washers to generate radial growth thereof.

Operation

Upon rotation of the input shaft 12 which is supported between the traction rollers 2, the traction rollers 2 roll along the traction sleeve 31 thereby causing rotation of the output shaft 21 at reduced speed but increased torque. The reaction torque provided by the ring structure 3 causes relative movement of the cam structures 34, thereby forcing the support ring 32 with its shoulder 35 toward the spring washers 30. The spring washers are compressed and grow radially, thereby forcing the traction sleeve 31 onto the traction rollers 2 and the traction rollers 2 into engagement with the traction sleeve 31 and the sun roller 1 with a force which depends on the torque transmitted through the transmission.

With the arrangement described, the necessary reaction forces are relatively small thereby making the arrangement suitable for relatively low power transmissions. Furthermore, manufacturing tolerances are relatively large and manufacturing costs are relatively low.

I claim:

1. A traction roller transmission comprising a traction ring structure having inner traction surfaces, a sun roller centrally disposed within the traction ring structure and having a circumferential traction surface spaced from the traction surface of said traction ring structure, planetary traction rollers supported in the space between the sun roller and the traction ring structure, at least one of said traction surfaces being formed on a sleeve supported by a stack of spring washers, said spring washers being inclined radially and having slots extending radially from the interface with said sleeve, said transmission further including means for axially compressing said spring washers when a torque is transmitted through said transmission so as to cause radial expansion of said spring washers for forcing said sleeve over its whole circumference toward and into engagement with said traction rollers.

2. A traction roller transmission as claimed in claim 1, wherein a ring support structure is provided adjacent the radial ends of said spring washers opposite said sleeve for backing up said spring washers.

3. A traction roller transmission as claimed in claim 2, wherein said ring support structure surrounds said spring washers and is associated with said traction ring structure.

4. A traction roller transmission as claimed in claim 3, wherein said ring support structure has an axial cam structure adapted to force said ring structure toward said spring washers upon transmission of a torque.

5. A traction roller transmission as claimed in claim 1, wherein said spring washers are Belleville-type spring rings.

6. A transmission as claimed in claim 1, wherein said spring washers are radially curved with their radial center section protruding in one and the radial ends protruding in the opposite axial direction.

* * * * *